(12) United States Patent
Jones

(10) Patent No.: US 6,220,609 B1
(45) Date of Patent: Apr. 24, 2001

(54) OSCILLATING RIDE-ON VEHICLE

(75) Inventor: Micheal D. Jones, Portland, OR (US)

(73) Assignee: Columbia-Inland Corporation, Oregon City, OR (US)

( * ) Notice: Subject to any disclaimer, the term of this patent is extended or adjusted under 35 U.S.C. 154(b) by 0 days.

(21) Appl. No.: 09/399,009

(22) Filed: Sep. 20, 1999

(51) Int. Cl.⁷ .................................................. A63G 19/04
(52) U.S. Cl. .......................................... 280/1.13; 280/249
(58) Field of Search .................................. 280/827, 828, 280/1.13, 242.1, 249, 250, 259, 263, 1.165

(56) References Cited

U.S. PATENT DOCUMENTS

| | | |
|---|---|---|
| 375,755 | 1/1888 | Kidder . |
| 1,620,926 | 3/1927 | Trullinger . |
| 1,679,819 * | 8/1928 | Fageol ................................ 280/229 |
| 3,589,749 * | 6/1971 | Byrd et al. ........................... 280/211 |
| 3,718,344 * | 2/1973 | Lohr et al. ........................... 280/261 |
| 3,760,533 * | 9/1973 | Zopf ........................................ 46/105 |
| 3,782,751 * | 1/1974 | Williams ............................ 280/87.01 |
| 3,804,427 * | 4/1974 | Lohr et al. ...................... 280/1.11 R |
| 3,831,977 * | 8/1974 | Osborne et al. .................... 280/229 |
| 3,986,725 * | 10/1976 | Terry ................................... 280/240 |
| 4,518,176 * | 5/1985 | Hegedus .............................. 280/229 |
| 4,759,557 * | 7/1988 | Kassai ............................... 280/1.165 |
| 4,787,647 * | 11/1988 | Oh ....................................... 280/240 |
| 4,861,055 | 8/1989 | Jones . |
| 4,925,200 | 5/1990 | Jones . |
| 5,120,074 * | 6/1992 | Herman et al. ...................... 280/220 |
| 5,549,313 * | 8/1996 | James et al. ......................... 280/221 |
| 5,829,772 | 11/1998 | Jones . |
| 5,947,739 * | 9/1999 | Lenihan ................................ 434/29 |

FOREIGN PATENT DOCUMENTS

3236707 A1 * 4/1984 (DE) .

* cited by examiner

Primary Examiner—Brian L. Johnson
Assistant Examiner—Daniel Yeagley
(74) Attorney, Agent, or Firm—Robert D. Varitz, PC

(57) ABSTRACT

A ride-on vehicle having a longitudinal axis includes a body; a rear axle having a crank portion therein and rotatably secured to the body; a pair of spaced-apart driven rear wheels eccentrically fixed to the rear axle; a forward crank rotatably secured to the body and driven by a vehicle rider; and a shaft extending between the rear axle crank portion and the forward crank; wherein rotation of the forward crank results in a driving force being transmitted through the shaft to the rear axle crank portion, thereby causing the vehicle to move along its longitudinal axis and wherein the body oscillates vertically when the vehicle moves along its longitudinal axis.

19 Claims, 2 Drawing Sheets

OSCILLATING RIDE-ON VEHICLE

FIELD OF THE INVENTION

This invention relates to human-powered ride-on vehicles, and specifically to a ride-on vehicle having an oscillating rear driving wheel.

BACKGROUND OF THE INVENTION

There are many forms of human-powered vehicles described in the patent and technical literature. Some of these known vehicles are intended to provide a carnival-type ride, wherein the rider may, at the rider's will, be subjected to G-forces, generally of the lateral variety. Ride-on vehicles such as the Big Wheel® achieve such G-forces through the provision of a large, driven front wheel, and the provision of independent braking systems on much smaller rear wheels.

A variety of power systems are known for human powered, ride-on vehicles. U.S. Pat. No. 375,755, to Kidder, granted Jan. 3, 1888, for Velocipede depicts a tricycle having large, powered rear wheels and a small, steerable front wheel, mounted on a curved, non-forked support.

U.S. Pat. No. 1,620,926, to Trullinger, granted Mar. 15, 1927, for Coaster Wagon depicts a steering mechanism which incorporates a pivotable steering linkage.

U.S. Pat. No. 4,861,055, granted Aug. 29, 1989 for Drive Mechanism; U.S. Pat. No. 4,925,200, granted May 15, 1990 for Tricycle Drive Mechanism; and U.S. Pat. No. 5,829,772, granted Nov. 3, 1998 for Ride-on, Human-powered Vehicle Drive and Steering Mechanism are my previously issued patents depicting a variety of propulsion, steering and braking mechanism.

Ride-on vehicles for toddlers, however, are generally limited to the Kidde-Kar-type of vehicle, which is driven and turned solely by leg power of the rider. Such vehicles generally do not have any type of mechanical motive power because of the limited motor skills of the rider.

SUMMARY OF THE INVENTION

A ride-on vehicle having a longitudinal axis includes a body; a rear axle having a crank portion therein and rotatably secured to the body; a pair of spaced-apart driven rear wheels eccentrically fixed to the rear axle; a forward crank rotatably secured to the body and driven by a vehicle rider, and a shaft extending between the rear axle crank portion and the forward crank; wherein rotation of the forward crank results in a driving force being transmitted through the shaft to the rear axle crank portion, thereby causing the vehicle to move along its longitudinal axis and wherein the body oscillates vertically when the vehicle moves along its longitudinal axis.

An object of the invention is to provide a ride-on vehicle having an oscillating drive.

Another object of the invention is to provide a toddler ride-on vehicle having a whimsical body style and drive mechanism.

These and other objects and advantages of the invention will become more fully apparent as the description which follows is read in conjunction with the drawing.

DETAILED DESCRIPTION OF THE PREFERRED EMBODIMENT

Figure 1:
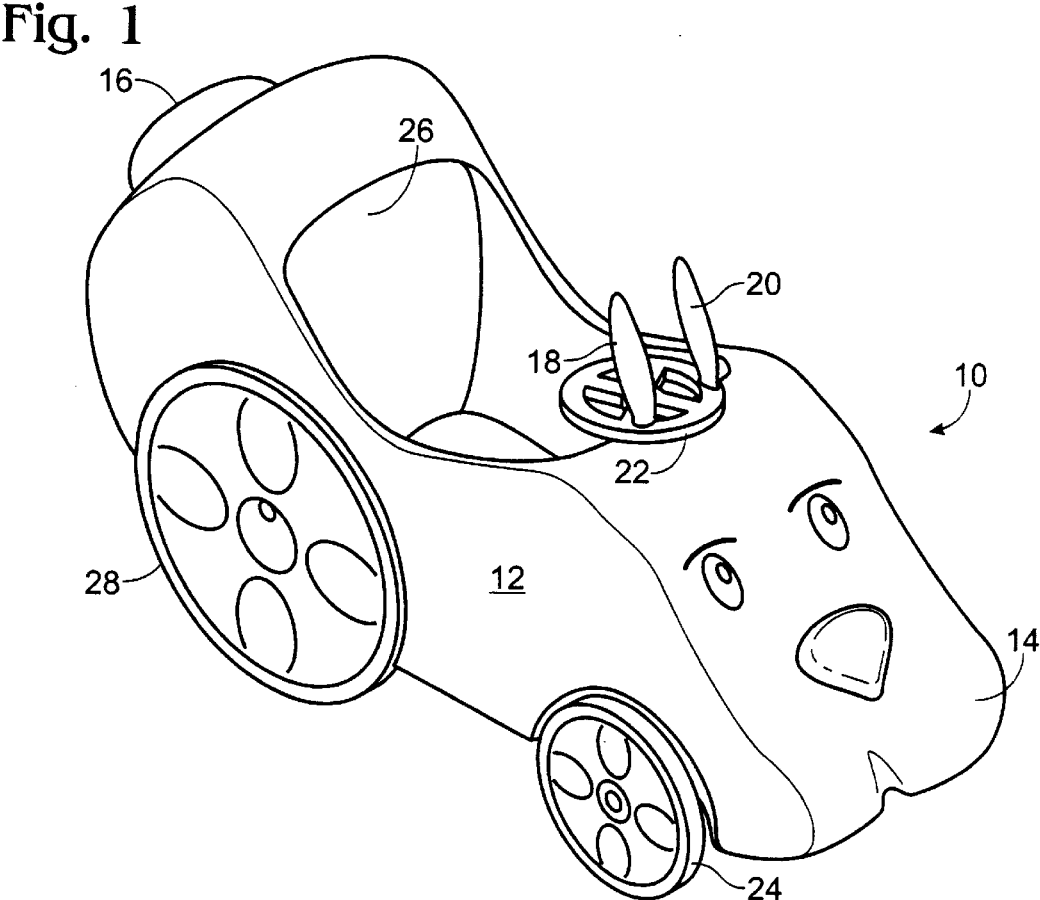
FIG. 1 is a perspective view of the ride-on vehicle of the invention.
Figure 2:
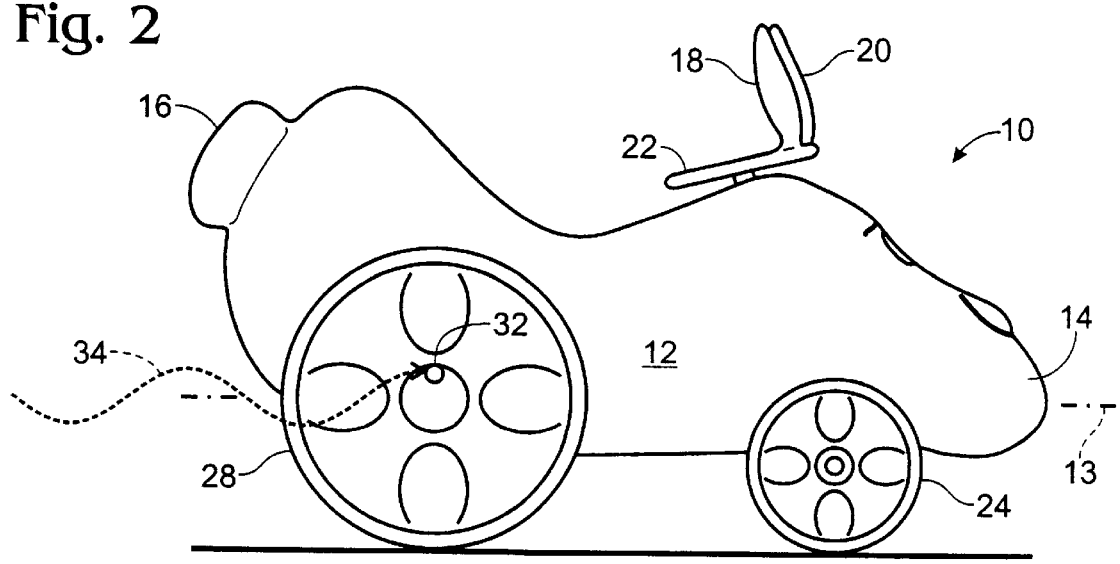
FIG. 2 is a side elevation of the vehicle of FIG. 1.

Turning now to the drawings, and referring initially to FIGS. 1 and 2, a ride-on vehicle constructed according to the invention is depicted generally at 10. Vehicle 10 is intended for use by toddlers, i.e., children from ages one to four. To make the vehicle more appealing to young riders, the vehicle may be constructed with a body 12 which is whimsical or animal-like in configuration. A longitudinal axis 13 extends the length of vehicle 10. Body 12, in the depicted embodiment, is meant to resemble a rabbit, and has a rabbit face 14, a rabbit tail 16, and rabbit ears 18,20, which are attached to a crank grip 22. In this embodiment, crank grip 22 is a wheel-like structure, although, as will become apparent, crank grip 22 is not a steering wheel in the usual sense of the words. Other animal forms, such as frogs, kangaroos, etc., may be used.

Vehicle 10 includes front wheels 24, which are rotatably mounted relative to body 12, and which may be mounted on a solid axle or mounted on projections from body 12. Front wheels 24 are non-driven, and are, in the preferred embodiment, non-steerable. Vehicle 10 is directionally controllable by the rider, who sits in seat 26, and whose legs extend over the sides of the vehicle. The rider's legs may be used to stop the vehicle and to change the direction thereof. Vehicle 10 also includes a pair of rear wheels 28, which are driven wheels.

Figure 3:
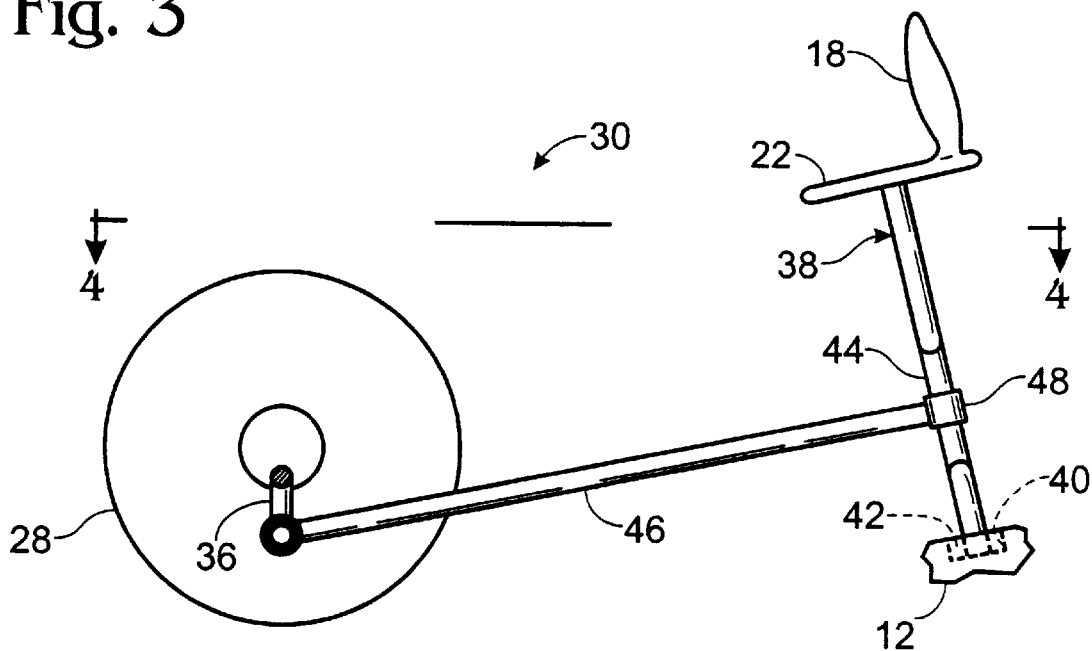
FIG. 3 is a side view of the vehicle drive mechanism.
Figure 4:
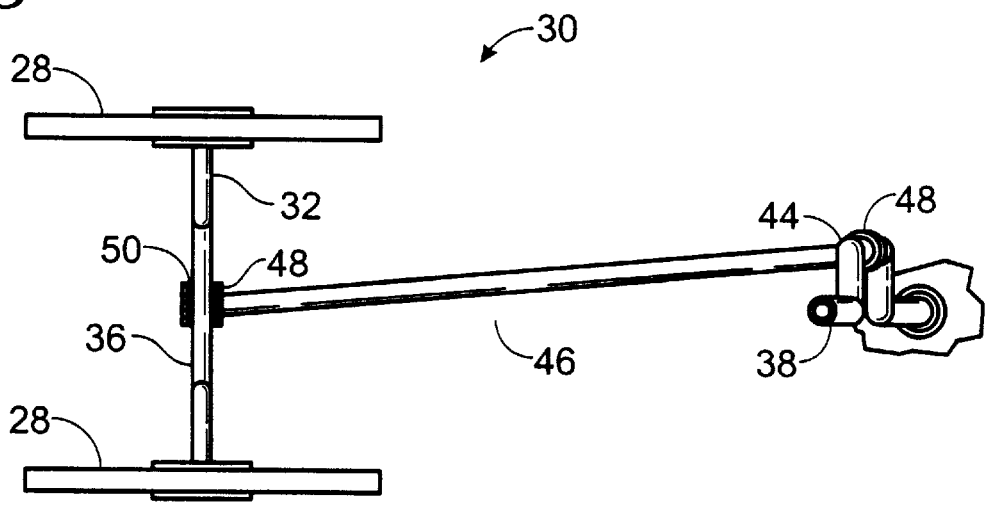
FIG. 4 is a top plan view of the vehicle drive mechanism of FIG. 3.

Turning now FIGS. 3 and 4, the drive mechanism of the invention will be described. The drive mechanism, shown generally at 30, includes a rear axle 32 which is rotatably secured to body 12, and which has wheels 28 attached at either end thereof. Axle 32 is substantially perpendicular to longitudinal axis 13 and extends generally parallel to the surface supporting vehicle 10. Wheels 28 are fixed to rear axle 32 and turn therewith, however, wheels 28 are eccentrically attached to axle 32, so that, as axle 32 rotates, the axle describes a vertically oscillating path, shown at 34 in FIG. 2. Rear axle 32 includes a crank portion 36, which is offset from the axis of the axle.

A forward crank 38 is rotatably secured to body 12, by means of a bore 40 and bearing 42 located in body 12. Forward crank 38 includes an offset 44, which is configured similarly to crank portion 36 of rear axle 32. Crank grip 22 is attached at the upper, free end of forward crank 38. Forward crank 38 is also rotatably attached to body 12 at some point below crank grip 22 and offset 44. A shaft 46 extends between crank portion 36 of rear axle 32 and offset 44 of forward crank 38. As shown in FIG. 4, shaft 46 is terminated on each thereof with a shaft sleeve 48, which includes a polymer bearing 50.

When forward crank 38 is rotated, a driving force is transmitted through shaft 46 to crank portion 36 of rear axle 32, causing vehicle 10 to move along its longitudinal axis. Because of the eccentric mount of axle 32 to wheels 28, the vehicle and its body oscillate vertically as the vehicle moves along its longitudinal axis. When vehicle 10 is at rest, i.e., when the vehicle is allowed to reach equilibrium, wheels 28 will rest with axle 32 at a low point, as shown in FIG. 3, relative to body 12. The drive mechanism is constructed and arranged so as to place crank portion 36 in a substantially vertical orientation, which may be either above or below axle 32, so that when forward crank 38 is initially rotated, a driving force will be imparted to rear wheels 28. Such arrangement also requires that shaft 46 be sized to have offset 44 extending substantially normal to longitudinal axis 13 when the vehicle is at rest. Rotational movement of forward crank 38 about a substantially vertical axis is thus converted to rotational movement of axle 32 about a substantially horizontal axis.

A child may operate the vehicle by sitting on seat 26, straddling body 12. Turning crank grip 22 will cause rear wheels 28 to rotate, thereby moving vehicle 10 forward or backwards, depending on the direction of rotation of crank grip 22.

Thus, a ride-on vehicle having an oscillating drive mechanism has been disclosed. Although a preferred embodiment of the ride-on vehicle, and several variations thereof, have been disclosed, it will be appreciated that further modification and variations thereto may be made without departing from the scope of the invention as defined in the appended claims.

I claim:

1. A ride-on vehicle having a longitudinal axis comprising:
    a body;
    a rear axle having a crank portion therein and rotatably secured to said body;
    a pair of spaced-apart driven rear wheels eccentrically fixed to said rear axle;
    a substantially vertically-disposed forward crank rotatably secured to said body for full, 360° rotation, and driven by a vehicle rider; and
    a shaft extending between said rear axle crank portion and said forward crank;
    wherein rotation of said forward crank results in a driving force being transmitted through said shaft to said rear axle crank portion, thereby causing the vehicle to move along its longitudinal axis and wherein said body oscillates vertically when the vehicle moves along its longitudinal axis.

2. The vehicle of claim 1 wherein, when the vehicle is at rest, said rear crank portion is in a substantially vertical orientation relative to said rear axle and said rear axle is located at a low point relative to said rear wheels.

3. The vehicle of claim 1 which further includes a pair of non-driven front wheels.

4. The vehicle of claim 3 wherein said front wheels are non-steerable.

5. The vehicle of claim 1 which further includes a crank grip mounted on said forward crank.

6. The vehicle of claim 5 wherein said crank grip is a substantially horizontally-disposed wheel-like structure.

7. The vehicle of claim 6 wherein said crank grip includes animal-like features.

8. A ride-on vehicle having a longitudinal axis comprising:
    a body;
    a rear axle having a crank portion therein and rotatably secured to said body;
    a pair of spaced-apart driven rear wheels eccentrically fixed to said rear axle;
    a forward crank vertically, fully rotatably about a substantially vertical axis secured to said body and driven by a vehicle rider; and
    a shaft extending between said rear axle crank portion and said forward crank;
    wherein rotation of said forward crank results in a driving force being transmitted through said shaft to said rear axle crank portion, thereby causing the vehicle to move along its longitudinal axis, wherein said body oscillates vertically when the vehicle moves along its longitudinal axis, and wherein when the vehicle is at rest, said rear crank portion is in a substantially vertical orientation relative to said rear axle and said rear axle is located at a low point relative to said rear wheels.

9. The vehicle of claim 8 which further includes a pair of non-driven front wheels.

10. The vehicle of claim 9 wherein said front wheels are non-steerable.

11. The vehicle of claim 8 which further includes a crank grip mounted on said forward crank.

12. The vehicle of claim 11 wherein said crank grip is a substantially horizontally disposed wheel-like structure which includes animal-like features thereon.

13. The vehicle of claim 8 wherein said body includes animal-like features.

14. A ride-on vehicle having a longitudinal axis comprising:
    a body;
    a horizontally extending rear axle having a crank portion therein and rotatably secured to said body;
    a pair of spaced-apart driven rear wheels eccentrically fixed to said rear axle;
    a vertically extending forward crank rotatably secured to said body and driven by a vehicle rider, wherein said forward crank is fully rotatable through 360° in a clockwise direction or in a counterclockwise direction about a substantially vertical axis; and
    a substantially horizontally extending shaft extending between said rear axle crank portion and said forward crank;
    wherein rotation of said forward crank about a substantially vertical axis results in a driving force being transmitted through said shaft and converted to substantially horizontal rotation of said rear axle, thereby causing the vehicle to move along its longitudinal axis and wherein said body oscillates vertically when the vehicle moves along its longitudinal axis.

15. The vehicle of claim 14 wherein, when the vehicle is at rest, said rear crank portion is in a substantially vertical orientation relative to said rear axle and said rear axle is located at a low point relative to said rear wheels.

16. The vehicle of claim 14 which further includes a pair of non-driven front wheels.

17. The vehicle of claim 16 wherein said front wheels are non-steerable.

18. The vehicle of claim 14 which further includes a crank grip mounted on said forward crank.

19. The vehicle of claim 14 wherein said crank grip and said body include animal-like features.

* * * * *